United States Patent [19]

Graham

[11] 3,864,155

[45] Feb. 4, 1975

[54] GLASS FIBER SIZE AND RESULTING PRODUCT

[75] Inventor: Roy R. Graham, Lexington, N.C.

[73] Assignee: PPG Industries, Inc., Pittsburgh, Pa.

[22] Filed: Apr. 27, 1973

[21] Appl. No.: 355,237

[52] U.S. Cl. .......... 117/126 GB, 65/3, 117/126 GQ
[51] Int. Cl. ............................................ C03c 25/02
[58] Field of Search ..... 65/3; 117/126 GB, 126 GQ; 260/309.6

[56] References Cited
UNITED STATES PATENTS

| | | | |
|---|---|---|---|
| 3,133,826 | 5/1964 | Varlet | 117/126 GB |
| 3,287,096 | 11/1966 | Marzocchi et al. | 65/3 |
| 3,533,768 | 10/1970 | Wong et al. | 65/3 |
| 3,551,383 | 12/1970 | Fang | 117/126 GB |
| 3,676,095 | 7/1972 | Stalego | 65/3 |

*Primary Examiner*—Robert L. Lindsay, Jr.
*Attorney, Agent, or Firm*—Robert DeMajistre

[57] ABSTRACT

A method of producing an improved sized glass fiber chopped strand suitable for the manufacture of articles formed from aqueous dispersion is shown wherein glass fiber filaments are treated with an aqueous sizing solution comprising gelatin, an n-alkyl N-amido-alkyl imidazoline and a fatty acid amide.

8 Claims, No Drawings

GLASS FIBER SIZE AND RESULTING PRODUCT

DESCRIPTION OF PRIOR ART

A glass fiber strand is composed of a multitude of fine glass filaments which are formed by being drawn at a high rate of speed from molten cones of glass located at the tips of small orifices in a bushing such as shown in U.S. Pat. No. 2,133,238. During formation, the filaments are coated while moving at a speed on the order of 5,000 to 20,000 feet per minute with a size which contains a binder to give the strand integrity for workability for any standard textile or reinforcement use. The size also contains a lubricant for the filaments to prevent destruction of the strand by abrasion of the individual filaments against each other or against handling equipment.

When glass fibers are used in the form of chopped strand for reinforcement, the sizing composition is formulated in order that the coating on the chopped strand is compatible with the matrix of the fiber glass to effect maximum strength. The size employed is usually an aqueous dispersion or emulsion of a film forming synthetic resinous binder and a glass fiber textile lubricant.

Chopped strand is often provided by mechanical chopping a fiber glass roving. Roving is formed by unwinding a plurality of strands from forming packages mounted on a creel, combining the strands in parallel form and winding the strands on a tubular support in a manner such that the combined strands can be unwound and processed. Such processing includes chopping typically in the form of a high speed cutter through which the roving is passed.

The sizing composition applied to glass fibers is of particular importance when chopped fiber glass strand is the desired end product. If the roving used to provide the glass strand does not have the proper size on the strands, it will fuzz during the chopping operation and be difficult to collect. Also an improper size will cause meshing rather than chopping. Meshing is the phenomena whereby the roving is crimped (i.e., not cut through, but merely bent) rather than chopped, hence, making the fiber glass roving undesirable for many uses.

Chopped strand is used for reinforcement for articles composed of resinous and of inorganic materials. Of particular importance is the reinforcement of mineral fiber boards for acoustical insulation. Also, chopped strand is useful in the formation of glass fiber paper.

Both glass fiber paper and mineral fiber board are formed from aqueous dispersions or slurries. Glass fiber paper is formed by making an aqueous slurry of chopped fiber glass strand whereby said chopped strand is agitated in water thereby dispersing the strands homogeneously throughout the aqueous slurry. Fillers and colorants known to the art can be added to the glass fiber slurry. For example, such fillers could be clay, talc, titanium dioxide, lithopone, burnt gypsum and the like: common colorants would be basic, acid and direct dyes. The slurry is deposited on a porous support and the majority of the aqueous portion of the slurry is removed by vacuum, the solids portion of the slurry is thereby formed into a mat or wet web on the support. The wet web is then pressed in a suitable apparatus to remove retained water and then dried to form the final paper product. Mineral fiber board is formed analogous to paper formation. Slag wool or rock wool and/or chopped glass fiber strand are slurried in an aqueous media until the solid components are homogeneously distributed throughout the slurry. The slurry is then deposited on a porous support and the water is removed by either gravity or vacuum to form a wet woolfelt sheet which is subsequently dried and formed into the desired dimensions.

Of particular importance is the sizing composition on the glass fiber whereby the size imparts the proper degree of hydrophilic character to the surface of the glass fibers. Great difficulty has been encountered by the manufacturers of glass fiber chopped strand in producing a sized glass fiber strand which will impart the necessary forming and chopping characteristics while still maintaining the ability to be adequately dispersed throughout an aqueous slurry, intermediate to the formation of glass fiber paper or glass fiber reinforced mineral fiber board.

THE INVENTION

Thus in accordance with this invention, improved chopped glass fiber strand is provided by treating glass fibers during formation with a specific size composition in order that it may be produced and processed efficiently and without waste. Strand formed from such sized glass fibers encounters little or no fuzzing during formation and during chopping operations is found to be readily cut with little or no meshing occurring.

Further in accordance with this invention a chopped glass fiber strand is provided which is readily dispersible in aqueous media, thereby making said chopped glass fiber strand useful for reinforcement of mineral fiber board and the production of glass fiber paper.

Thus, the instant invention involves treating glass fibers during their formation with an aqueous solution of a sizing composition whose solids comprise 40 percent to 93 percent by weight of gelatin, 5.55 percent to 44.6 percent by weight of an n-alkyl N-amidoalkyl imidazoline, and 0.95 percent to 16.7 percent by weight of a solubilized fatty acid amide and gathering the fibers so treated into glass fiber strands. The glass fiber strands are subsequently chopped and the chopped strand product is composed of 0.2 percent to 3 percent of the aforementioned sizing solids composition.

The gelatin is that which is obtained from the selective hydrolysis of the major intercellular protein (collagen) constituent of animal dry bone, animal dehaired hides and porkskins. This hydrolysis product consists of soluble proteins of high average molecular weight (10,300 to 100,000) that is capable of forming a firm gel in aqueous medium.

The n-alkyl N-amidoalkyl imidazolines can be selected from the class which may be formed by causing fatty acids to react with polyalkylene polyamines under conditions which produce ring closure. The reaction of tetraethylene pentamine with stearic acid is exemplary of such reaction. These imidazolines are described more fully in U.S. Pat. Nos. 2,267,965, 2,268,273 and 2,355,837.

The solubilized fatty acid amide includes saturated and unsaturated fatty acid amides wherein the acid group contains 4 to 24 carbon atoms and solubilized polymers of the lower molecular weight, unsaturated fatty acid amide. A suitable material is the pelargonic acid amide of tetraethylene pentamine.

Anti-foaming agents may be used in the practice of this invention to prevent foaming of the sizing solution if desired. Examples of useful anti-foaming agents are silicone polymers used to reduce the surface tension of the aqueous solution such as Union Carbide SAG 470.

Biocides may be used also in the practice of this invention, if desired, to prevent attack on the sizing solution by fungus or bacteria. Examples of biocides which may be employed for this use are tributyl tin oxide, quaternary ammonium salts and mixtures thereof and the like.

In addition ionic or non-ionic surfactants also may be used in the practice of this invention where desired to effect flow or other desirable solution and application properties. Examples of suitable non-ionic surfactants are octylphenoxypoly (ethyleneoxy) ethanol sorbitan monostearate, sorbitan monooleate and the like. Examples of suitable ionic surfactants are the triethyl amine salt of lauryl sulfate, sodium stearate and the like.

The total solids (non-aqueous) content of the size of the instant invention is about 1 to 20 percent by weight of the sizing solution, preferably about 1 to 10 percent by weight of the sizing solution. In all events the solids content of the sizing solution should be adjusted so that the viscosity of 20° C. of said solution does not exceed 100 centipoises. This viscosity restriction is necessary in order that the filaments do not break during application of the sizing solution.

DESCRIPTION OF THE PREFERRED EMBODIMENT

The following example is illustrative of one method of producing the instant invention.

The size applied to the fiber glass strand in accordance with this invention was composed of the ingredients shown in Table I.

Table I

| | Ingredients | Parts by weight (grams) |
|---|---|---|
| 1. | Gelatin | 500 |
| 2. | n-alkyl N-amidoalkyl imidazoline (Reaction product of tetraethylene pentamine and stearic acid) | 150 |
| 3. | Fatty acid amide (pelargonic acid amide of tetraethylene pentamine) | 25 |
| 4. | Octylphenoxypoly (ethyleneoxy) ethanol | 25 |
| 5. | Anti-foaming agent (Union Carbide SAG 470) | 5 |
| 6. | Biomet 66 (tributyl tin oxide and a quaternary ammonium salt) | 0.34 |
| 7. | Water | Sufficient to make 10 gal. of size. | pH 5.69
solids 1.70%

An aqueous solution of the above ingredients is formed by adding the gelatin to the water with agitation. After the gelatin is dissolved, each of the above remaining ingredients are added in succession after each prior ingredient dissolves.

The aqueous size so prepared is thus applied to individual glass fibers during their formation in the conventional manner from a glass fiber bushing. The aqueous size solution is applied to the individual fibers just after their emergence from orifices in an electrically heated, platinum alloy bushing containing molten glass to form filaments of .0025 inch in diameter. The aqueous size is applied to the filaments prior to the time they are grouped together to form a strand containing 800 filaments by means of a roller applicator which is partially submerged in a size containing reservoir. Such an applicator is shown in more detail in U.S. Pat. No. 2,728,972. The fibers are grouped into a strand by a graphite guide and wound around a forming tube rotating at approximately 4,420 rpm to produce a strand travel of approximately 14,000 feet per minute.

Other methods of applying the size to the strand of glass fibers, such as a pad applicator, may be employed and the strand may be formed by means other than winding on the forming tube, such as by means of a pair of rotating wheel pullers which direct the strand into a suitable collecting device.

The sized glass fiber strand wound on the forming tube is then dried. This may be done by heating strand packages at a temperature and for a length of time sufficient to reduce the moisture level to that appropriate for further processing, typically 4 to 10 percent by weight. A particular advantage of the present invention is the minimal drying time necessary to effect drying sufficient for further processing. thus, drying times of 4 to 8 hours at room temperature are satisfactory to reduce the moisture content to an acceptable level, i.e., 4 to 10 percent by weight.

After the strands have been dried to an acceptable level, the forming packages are mounted on a creel and subsequently unwound and processed through a chopper; any chopping device known to the art can be used. An example of a conventional chopper would be a Brenner cutter or a reciprocating knife which chops the strand into the desirable length, i.e., about one-half inch.

During the chopping of strand containing the size above described, enhanced chopping characteristics were noted in that the strand chopped with virtually no fuzz or fly and had adequate bundle integrity to form desirable packaging characteristics.

Chopped strand which is produced according to the practice of this invention has demonstrated excellent water dispersibility when used for reinforcement of mineral fiber board acoustical insulation. Not only is the manufacture of the said board facilitated by the practice of the invention, but the strength of the board is enhanced also. The practice of this invention has shown excellent processing characteristics when used in the production of glass fiber paper.

It also is noted that the sizing solution used in the present invention is in fact a solution, not an emulsion or dispersion as is conventionally used in the sizing of glass fibers. Emulsification equipment, usually high speed agitators, is not necessary to form a homogeneous mixture but only minimal agitation is required to achieve a homogeneous solution for application to the glass fiber strands.

The present invention provides a distinct advantage over the prior art in that acceptable forming, winding, chopping and dispersion characteristics can be obtained when as little as 0.2 percent by weight of the coating is added onto the chopped glass fiber strand. The normal level of sizing composition (other than the sizing composition of this invention) to impart the aforementioned characteristics which is added onto the glass fibers is 1.0 to 1.5 percent by weight; hence, the practice of this invention minimizes the amount of size required to impart the properties of a superior chopped glass fiber strand for use as reinforcement for articles formed from aqueous dispersions or slurries.

Although the present invention has been described with respect to specific details and embodiments, it is

I claim:

1. In the method of forming chopped glass fiber strand for use as reinforcement for articles formed from aqueous dispersion, which comprises drawing glass streams through orifices in a bushing to form individual glass fibers, moving the fibers away from the bushing at a high rate of speed and forming them into a strand, applying to the fibers while they are moving at this speed and before strand formation an aqueous sizing solution whose solids comprise 40 percent to 93 percent by weight of gelatin, 5.55 percent to 44.6 percent by weight of an n-alkyl N-amidoalkyl imidazoline and 0.95 to 16.7 percent by weight of a solubilized fatty acid amide said sizing solution having a viscosity less than 100 centipoise at 20° C., drying the strand so formed and chopping said strands.

2. The method of claim 1 wherein the solids of said sizing composition comprise 74 percent by weight of gelatin.

3. The method of claim 1 wherein the solids of said sizing composition comprise 22 percent by weight of an n-alkyl N-amidoalkyl imidazoline.

4. The method of claim 1 wherein the solids of said sizing composition comprise 4 percent by weight of a solubilized fatty acid amide.

5. Chopped glass fiber strand for use as reinforcement for articles formed from aqueous dispersions, having a coating thereon, constituting 0.2 percent to 3 percent of said glass fibers, said coating solids comprising 40 percent to 93 percent by weight of gelatin, 5.55 percent to 44.6 percent by weight of an n-alkyl N-amidoalkyl imidazoline and 0.95 percent to 16.7 percent by weight of a solubilized fatty acid amide.

6. Chopped glass fibers of claim 5 wherein the gelatin comprises 74 percent by weight of the coating composition.

7. Chopped glass fibers of claim 5 wherein the n-alkyl N-amidoalkyl imidazoline comprises 22 percent by weight of the coating composition.

8. Chopped glass fibers of claim 5 wherein the solubilized fatty acid amide comprises 4 percent by weight of the coating composition.

* * * * *